(12) United States Patent
Koyanagi

(10) Patent No.: US 6,894,966 B1
(45) Date of Patent: May 17, 2005

(54) INTERPOLATION CIRCUIT

(75) Inventor: Yukio Koyanagi, Yamanashi (JP)

(73) Assignee: Niigata Seimitsu Co., Ltd., Niigata (JP)

( * ) Notice: Subject to any disclaimer, the term of this patent is extended or adjusted under 35 U.S.C. 154(b) by 0 days.

(21) Appl. No.: 09/914,505

(22) PCT Filed: May 11, 2000

(86) PCT No.: PCT/JP00/03040

§ 371 (c)(1),
(2), (4) Date: Aug. 28, 2001

(87) PCT Pub. No.: WO00/68826

PCT Pub. Date: Nov. 16, 2000

(30) Foreign Application Priority Data

May 11, 1999 (JP) .......................... 11/165745

(51) Int. Cl.$^7$ .............................. G11B 5/09
(52) U.S. Cl. .................................. 369/59.22
(58) Field of Search .................... 369/44.34, 44.36, 369/44.44, 47.18, 59.16, 59.2, 59.22, 124.05

(56) References Cited

U.S. PATENT DOCUMENTS

| 5,812,508 | A | * | 9/1998 | Moon | ............... | 369/124.07 |
| 5,901,128 | A | * | 5/1999 | Hayashi et al. | ........ | 369/59.22 |
| 5,986,990 | A | * | 11/1999 | Moon | ............... | 369/59.22 |
| 6,477,125 | B1 | * | 11/2002 | Hayami | ............ | 369/47.35 |
| 6,671,244 | B2 | * | 12/2003 | Honma | ............. | 369/59.22 |
| 6,690,635 | B2 | * | 2/2004 | Tonami | ............ | 369/47.18 |
| 6,747,936 | B1 | * | 6/2004 | Shim | ............. | 369/59.22 |

FOREIGN PATENT DOCUMENTS

| JP | 5-282354 | 10/1993 |
| JP | 8-330957 | 12/1996 |

OTHER PUBLICATIONS

Qi Wang et al, "Circuit Design of A D/A Converter Using Spline Functions", Signal Processing, Mar., 1989, vol. 16, No. 3, pp. 279–288.

Akira Sakurai, Spline Kansu Nyumon, Tokyo: Tokyo Denki Daigaku Shuppan kyoku, 1986, p. 61, line 3, p. 103, line 1. Spline Functions and Applications, ©Akira Sakurai 1981.

* cited by examiner

Primary Examiner—Thang V. Tran
Assistant Examiner—Bach Vuong
(74) Attorney, Agent, or Firm—Dellett & Walters

(57) ABSTRACT

An interpolation circuit capable of performing interpolation operation with a simple constitution. A 16-times oversampling from discrete data is performed by D frip-frops 4, 5. A first convolution operation is performed by D frip-frops 4 through 11 and an adder 12, on the result of which a second convolution operation is performed by D frip-frops 13 through 20 and an adder 21. Data interpolated along a quadratic function curve interpolating the discrete data is obtained from the adder 21.

10 Claims, 15 Drawing Sheets

FIG. 4

| | (1) | (2) | (3) | (4) | (5) | (6) | (7) | (8) | (T1) |
|---|---|---|---|---|---|---|---|---|---|
| | 0 | 0 | 0 | 0 | 0 | 0 | 1 | 1 | 1 |
| | 0 | 0 | 0 | 0 | 0 | 1 | 1 | 1 | 2 |
| | 0 | 0 | 0 | 0 | 1 | 1 | 1 | 1 | 3 |
| | 0 | 0 | 0 | 1 | 1 | 1 | 1 | 1 | 4 |
| | 0 | 0 | 1 | 1 | 1 | 1 | 1 | 1 | 5 |
| | 0 | 1 | 1 | 1 | 1 | 1 | 1 | 1 | 6 |
| | 1 | 1 | 1 | 1 | 1 | 1 | 1 | 1 | 7 |
| | 1 | 1 | 1 | 1 | 1 | 1 | 1 | 1 | 8 |
| | 1 | 1 | 1 | 1 | 1 | 1 | 1 | 1 | 8 |
| | 1 | 1 | 1 | 1 | 1 | 1 | 1 | 1 | 8 |
| | 1 | 1 | 1 | 1 | 1 | 1 | 1 | 1 | 8 |
| | 1 | 1 | 1 | 1 | 1 | 1 | 1 | 1 | 8 |
| | 1 | 1 | 1 | 1 | 1 | 1 | 1 | 1 | 8 |
| | 1 | 1 | 1 | 1 | 1 | 1 | 1 | 1 | 8 |
| | 1 | 1 | 1 | 1 | 1 | 1 | 1 | 1 | 8 |
| | 1 | 1 | 1 | 1 | 1 | 1 | 1 | 0 | 7 |
| | 1 | 1 | 1 | 1 | 1 | 1 | 0 | 0 | 6 |
| | 1 | 1 | 1 | 1 | 1 | 0 | 0 | 0 | 5 |
| | 1 | 1 | 1 | 1 | 0 | 0 | 0 | 0 | 4 |
| | 1 | 1 | 1 | 0 | 0 | 0 | 0 | 0 | 3 |
| | 1 | 1 | 0 | 0 | 0 | 0 | 0 | 0 | 2 |
| | 1 | 0 | 0 | 0 | 0 | 0 | 0 | 0 | 1 |
| | 0 | 0 | 0 | 0 | 0 | 0 | 0 | 0 | 0 |

| | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|
| (1) | 0 | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | | | | | | | | | | |
| (2) | 0 | 0 | 0 | 0 | 0 | 1 | 1 | 1 | 1 | 1 | 1 | 1 | 1 | 1 | 1 | 1 | 1 | 1 | 1 | 1 | 1 | 0 | 0 | 0 | | | | | | | | | | |
| (T1) | 0 | 1 | 1 | 1 | 1 | 2 | 2 | 2 | 2 | 2 | 2 | 2 | 2 | 2 | 2 | 2 | 2 | 1 | 1 | 1 | 1 | 0 | 0 | 0 | | | | | | | | | | |
| (3) | 0 | 1 | 1 | 1 | 1 | 2 | 2 | 2 | 2 | 2 | 2 | 2 | 2 | 2 | 2 | 2 | 2 | 1 | 1 | 1 | 1 | 0 | 0 | 0 | | | | | | | | | | |
| (4) | 0 | 0 | 0 | 1 | 1 | 1 | 1 | 2 | 2 | 2 | 2 | 2 | 2 | 2 | 2 | 2 | 2 | 2 | 2 | 1 | 1 | 1 | 1 | 0 | | | | | | | | | | |
| (T2) | 0 | 1 | 1 | 2 | 2 | 2 | 3 | 3 | 4 | 4 | 4 | 4 | 4 | 4 | 4 | 4 | 4 | 3 | 3 | 2 | 2 | 1 | 1 | 0 | | | | | | | | | | |
| (5) | 0 | 1 | 1 | 2 | 2 | 3 | 3 | 4 | 4 | 4 | 4 | 4 | 4 | 4 | 4 | 4 | 4 | 3 | 3 | 2 | 2 | 1 | 1 | 0 | | | | | | | | | | |
| (6) | 0 | 0 | 1 | 1 | 2 | 2 | 3 | 3 | 4 | 4 | 4 | 4 | 4 | 4 | 4 | 4 | 4 | 4 | 3 | 3 | 2 | 2 | 1 | 1 | | | | | | | | | | |
| (T3) | 0 | 1 | 2 | 3 | 4 | 5 | 6 | 7 | 8 | 8 | 8 | 8 | 8 | 8 | 8 | 8 | 8 | 7 | 6 | 5 | 4 | 3 | 2 | 1 | | | | | | | | | | |
| (7) | 0 | 1 | 2 | 3 | 4 | 5 | 6 | 7 | 8 | 8 | 8 | 8 | 8 | 8 | 8 | 8 | 8 | 7 | 6 | 5 | 4 | 3 | 2 | 1 | | | | | | | | | | |
| (8) | 0 | 0 | 0 | 0 | 0 | 1 | 2 | 3 | 4 | 5 | 6 | 7 | 8 | 8 | 8 | 8 | 8 | 8 | 8 | 8 | 8 | 7 | 6 | 5 | | | | | | | | | | |
| (T4) | 0 | 1 | 2 | 3 | 4 | 6 | 8 | 10 | 12 | 13 | 14 | 15 | 16 | 16 | 16 | 16 | 16 | 15 | 14 | 13 | 12 | 10 | 8 | 6 | | | | | | | | | | |
| (9) | 0 | 1 | 2 | 3 | 4 | 6 | 8 | 10 | 12 | 13 | 14 | 15 | 16 | 16 | 16 | 16 | 16 | 15 | 14 | 13 | 12 | 10 | 8 | 6 | 4 | 3 | 2 | 1 | 0 | 0 | 0 | | | |
| (10) | 0 | 0 | 0 | 1 | 2 | 3 | 4 | 6 | 8 | 10 | 12 | 13 | 14 | 15 | 16 | 16 | 16 | 16 | 16 | 15 | 14 | 13 | 12 | 10 | 8 | 6 | 4 | 3 | 2 | 1 | 0 | | | |
| (T5) | 0 | 1 | 2 | 4 | 6 | 9 | 12 | 16 | 20 | 23 | 26 | 28 | 30 | 31 | 32 | 32 | 32 | 31 | 30 | 28 | 26 | 23 | 20 | 16 | 12 | 9 | 6 | 4 | 2 | 1 | 0 | | | |
| (11) | 0 | 1 | 2 | 4 | 6 | 9 | 12 | 16 | 20 | 23 | 26 | 28 | 30 | 31 | 32 | 32 | 32 | 31 | 30 | 28 | 26 | 23 | 20 | 16 | 12 | 9 | 6 | 4 | 2 | 1 | 0 | 0 | | |
| (12) | 0 | 0 | 1 | 2 | 4 | 6 | 9 | 12 | 16 | 20 | 23 | 26 | 28 | 30 | 31 | 32 | 32 | 32 | 31 | 30 | 28 | 26 | 23 | 20 | 16 | 12 | 9 | 6 | 4 | 2 | 1 | 0 | | |
| (T6) | 0 | 1 | 3 | 6 | 10 | 15 | 21 | 28 | 36 | 43 | 49 | 54 | 58 | 61 | 63 | 64 | 64 | 63 | 61 | 58 | 54 | 49 | 43 | 36 | 28 | 21 | 15 | 10 | 6 | 3 | 1 | 0 | | |
| (A1) | 0 | 1 | 3 | 6 | 10 | 15 | 21 | 28 | 36 | 43 | 49 | 54 | 58 | 61 | 63 | 64 | 64 | 63 | 61 | 58 | 54 | 49 | 43 | 36 | 28 | 21 | 15 | 10 | 6 | 3 | 1 | 0 | 0 | |
| (A2) | 0 | 0 | 1 | 3 | 6 | 10 | 15 | 21 | 28 | 36 | 43 | 49 | 54 | 58 | 61 | 63 | 64 | 64 | 63 | 61 | 58 | 54 | 49 | 43 | 36 | 28 | 21 | 15 | 10 | 6 | 3 | 1 | 0 | |
| (A3) | 0 | 1 | 4 | 9 | 16 | 25 | 36 | 49 | 64 | 79 | 92 | 103 | 112 | 119 | 124 | 127 | 128 | 127 | 124 | 119 | 112 | 103 | 92 | 79 | 64 | 49 | 36 | 25 | 16 | 9 | 4 | 1 | 0 | |

FIG. 22

INTERPOLATION CIRCUIT

TECHNICAL FIELD

The present invention relates to an interpolation circuit for generating interpolated data from discrete data.

BACKGROUND ART

Conventional CD (Compact Disk) reproducing devices employ a digital-analog converter of the oversampling method. This digital-analog converter performs interpolation operation for digital data discretely input, employing a sinc function or the like. However, this sinc function converges to 0 at $\pm\infty$, and has a shortcoming that if the arithmetic operation is truncated at the finite value, a truncation error occurs in the operation. Generally, a stepwise waveform obtained in the interpolation operation is passed through a low-pass filter, but there is also a drawback that a phase distortion or a distorted output waveform may arise through the low-pass filter.

Particularly, in the above interpolation operation using the sinc function, a method is taken in which the values of the sinc function are stored in a table, and read as needed, or held as the tap coefficients for a digital filter, but this method has a problem that the configuration is complex. Therefore, an interpolation circuit capable of performing interpolation operation with a simple constitution is desired.

DISCLOSURE OF THE INVENTION

The present invention has been achieved in the light of the aforementioned problems, and it is an object of the invention to provide an interpolation circuit capable of performing interpolation operation with a simple constitution.

The interpolation circuit of the invention comprises oversampling operation unit for performing oversampling operation from the zero-order hold input data, and first convolution operation unit for performing convolution operation on plural data obtained by the oversampling operation unit twice or more repeatedly, characterized in that interpolated data is generated along a quadratic function curve passing through the integral multiples of the value of input data.

Also, the interpolation circuit of the invention comprises oversampling operation unit for performing oversampling operation from the zero-order hold input data, second convolution operation unit for performing convolution operation on plural first data obtained by the oversampling operation unit to calculate plural second data enveloped by a symmetrical trapezoid of the shape having an upside of substantially 0.5 times the width of original input data and a base of substantially 1.5 times the width, and third convolution operation unit for performing convolution operation on the plural second data obtained by the second convolution operation unit to calculate plural third data enveloped by a smooth quadratic function curve having a width of the base being substantially twice that of the original input data.

Also, the interpolation circuit of the invention comprises oversampling operation unit for performing oversampling operation from the zero-order hold input data, and fourth convolution operation unit for performing convolution operation on plural data obtained by the oversampling operation unit to calculate plural data enveloped by an equilateral triangle having a base being substantially twice the width of original input data.

Also, the interpolation circuit of the invention comprises oversampling operation unit for performing oversampling operation from the zero-order hold input data with a sampling period of $2n \cdot T_1$ at a time interval of $T_1$, fifth convolution operation unit for performing convolution operation of n phases by adding plural data obtained by the oversampling operation unit n times with the data shifted by the time interval of TL, and sixth convolution operation unit for performing convolution operation of n phases by adding plural data obtained by the fifth convolution operation unit n times with the data shifted by the time interval of $T_1$.

In particular, at least one of the fifth and sixth convolution operation unit desirably comprises data holding unit for holding n pieces of data output from the oversampling operation unit while shifting, and addition unit for adding n pieces of data held in the data holding unit.

In the former stage of the oversampling operation unit, it is desirable to provide data appending unit for appending the data having the symmetrical values proportional to the input data before and after the input data.

BRIEF DESCRIPTION OF THE DRAWINGS

FIG. 4 is a chart showing a specific example of an interpolation operation;

FIG. 5 is a chart showing a specific example of an interpolation operation;

FIG. 11 is a diagram showing a specific example of the interpolation operation when 0, 3, 7, 5, −4, and 0 are input as the discrete data;

FIG. 15 is a diagram showing a specific example of arithmetic operation in the first, second and third convolution operation circuits included in the digital-analog converter as shown in FIG. 14;

FIG. 22 is a diagram showing a specific example of interpolation operation in the case where the discrete input data are 0, 3, 7, 5, −4 and 0.

BEST MODE FOR CARRYING OUT THE INVENTION

Embodiments of a digital-analog converter to which a data interpolation method of the present invention is applied will be described below with reference to the accompanying drawings.

[First Embodiment]

A digital-analog converter in a first embodiment of the invention performs interpolation operation employing a quadratic function curve connecting the input data smoothly when the discrete digital data is input.

Figure 1:
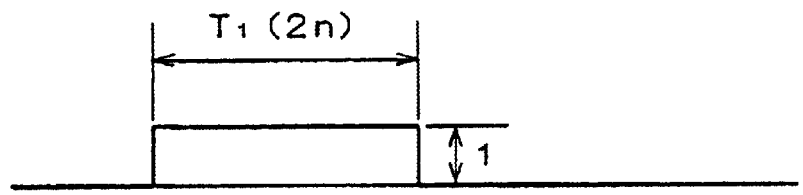
FIG. 1 is a graph for explaining a principle of interpolation operation that is performed by digital-analog converter of the first embodiment.
Figure 2:
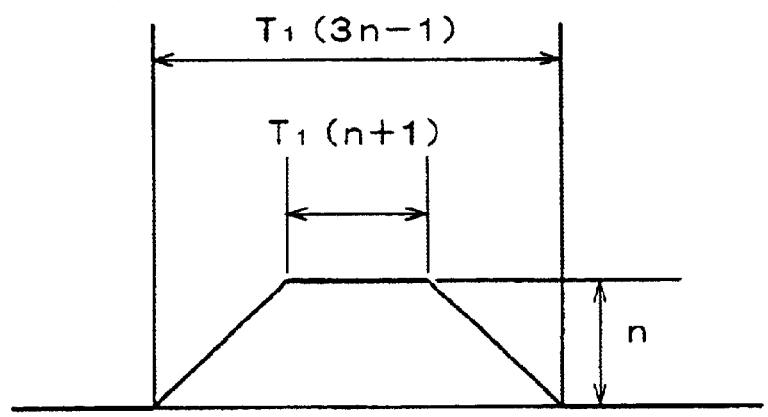
FIG. 2 is a graph for explaining a principle of interpolation operation that is performed by digital-analog converter of the first embodiment.
Figure 3:
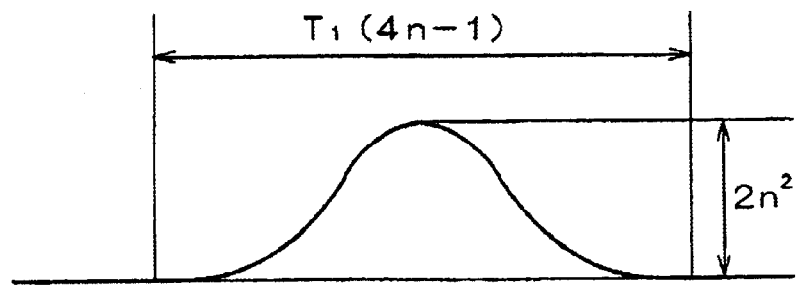
FIG. 3 is a graph for explaining a principle of interpolation operation that is performed by digital-analog converter of the first embodiment.

FIGS. 1 through 3 are graphs for explaining the principle of interpolation operation that is performed by the digital-analog converter in this embodiment of the invention, in which the single data is converted into data interpolated along a quadratic function curve. As shown in FIG. 1, the zero-order hold single data is considered to have an amplitude of 1 and a length of $2n \cdot T_1$. When the discrete data is input, the length $2n \cdot T_1$ for the single data is a cycle period (sampling frequency) of input data. For the data as shown in FIG. 1, the first convolution operation is performed by shifting the data by $T_1$ and performing oversampling operation from the data, and adding the data n times. Consequently, a symmetrical trapezoidal wave with the base of $(3n-1) \cdot T_1$, the upside of $(n+1) \cdot T_1$ and the height of n can be obtained, as shown in FIG. 2. Further, for this symmetrical trapezoidal wave, a second convolution operation is performed by shifting the data by $T_1$ and adding the data n times, so that a continuous quadratic function curve with the width of $(4n-1) \cdot T_1$ and the amplitude of $2n^2$ can be obtained, as shown in FIG. 3.

In this way, by performing oversampling operation for the zero-order hold input data and then performing convolution operation of n phases, the output data enveloped by the continuous quadratic function curve can be obtained. Therefore, considering a case of zero-order holding the discrete input data successively, the quadratic function curve corresponding to each input data is generated, while being shifted by $2n \cdot T_1$. As a result, the output is 2n pieces of data interpolated along the quadratic function curve passing through and smoothly connecting $2n^2$ times the input data.

Figure 5:
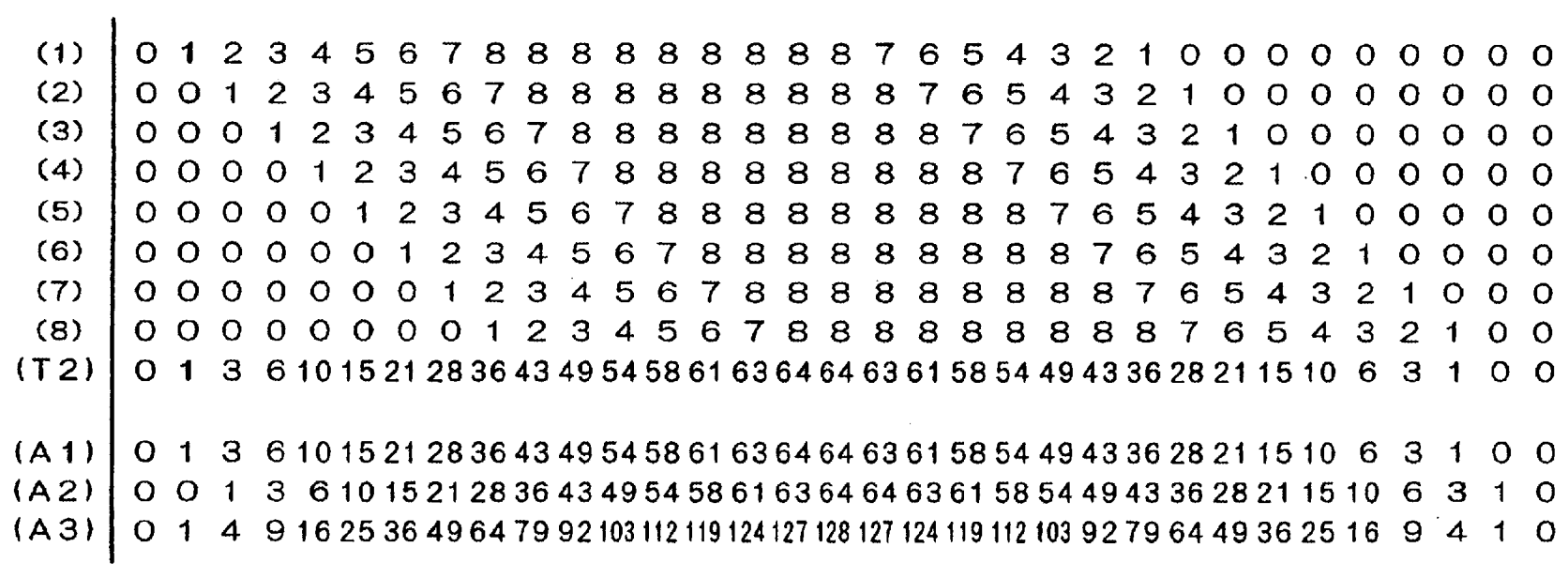

FIGS. 4 and 5 are charts showing a specific example of the above mentioned interpolation operation. Herein, a calculation example with n=8 is shown. The detailed contents of the first convolution operation are shown in FIG. 4, and the detailed contents of the second convolution operation are shown in FIG. 5.

In FIG. 4, each item of data listed at (1) is the zero-order hold data (data after oversampling operation) as shown in FIG. 1. The elapse of time is arranged in the transversal direction, the unit of time being $T_1$ corresponding to one column. Namely, it is supposed that the input data corresponding to FIG. 1 are 16 pieces of zero-order hold data, with the duration of $16T_1$ and an amplitude of 1. An 8-phase convolution operation is performed, comprising producing eight sets of data by shifting the zero-order hold data by time $T_1$, as shown in (1) through (8) in FIG. 4, and adding them. Consequently, a result of calculation is obtained as listed at $(T_1)$ in FIG. 4. From this result of calculation, it will be found that a symmetrical trapezoidal wave as shown in FIG. 2 is obtained.

In FIG. 5, each item of data listed at (1) is the data obtained by the first convolution operation, and the same as shown at (TL) in FIG. 4. As listed at (1) through (8) in FIG. 5, an 8-phase convolution operation is performed, comprising producing eight sets of data by shifting the data by time $T_1$, as shown in (1) through (8) in FIG. 5, and adding them. Consequently, a result of calculation is obtained as listed at (T2) in FIG. 5. (A1) of FIG. 5 is the data obtained by the second convolution operation, and the same as listed at (T2). A two-phase convolution operation (addition of (A1) data and (A2) data) is performed, comprising shifting the data listed at (A1) by $T_1$ ((A2) in FIG. 5), so that a result of calculation is obtained as listed at (A3) in FIG. 5.

Figure 6:
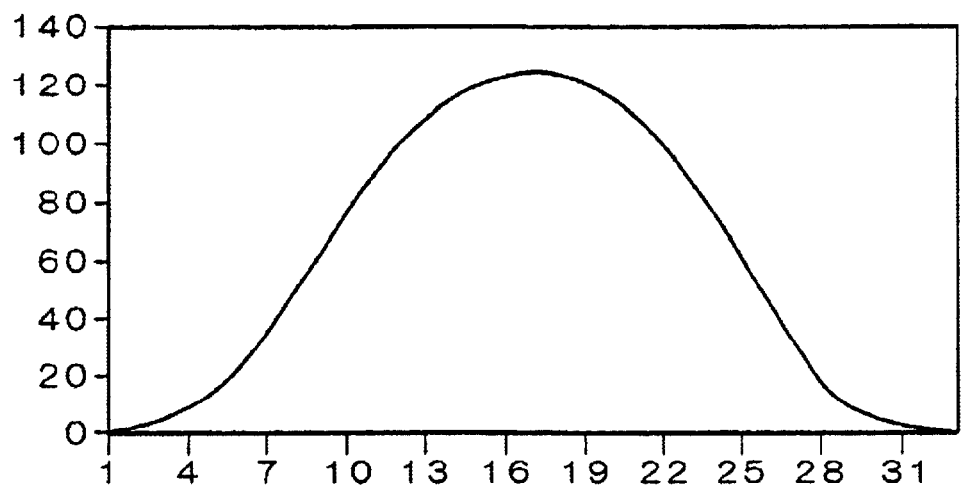
FIG. 6 is a graph showing a waveform that is finally obtained by arithmetic operations as shown in FIGS. 4 and 5.

FIG. 6 is a graph showing a waveform that is finally obtained by arithmetic operations as shown in FIGS. 4 and 5. The longitudinal axis indicates the amplitude, and the transversal axis indicates the time, respectively. As shown in FIG. 6, an original rectangular wave of zero-order hold data results in the oversampled data enveloped by a smooth quadratic function curve with a double width, the maximum amplitude being 128 times ($=2n^2$).

The above example is described employing the single input data. However, in the case where plural pieces of data are successively input, the data oversampled corresponding to each input data are arranged without overlapping each other. Therefore, when the data is input successively at a period of $2n \cdot T_1$, an interpolation curve always passes through the integral multiple (128 times) of each item of data.

Figure 7:
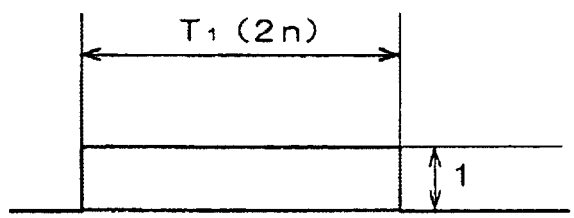
FIG. 7 is a diagram showing a waveform corresponding to the partial data shown in FIG. 4.
Figure 8:
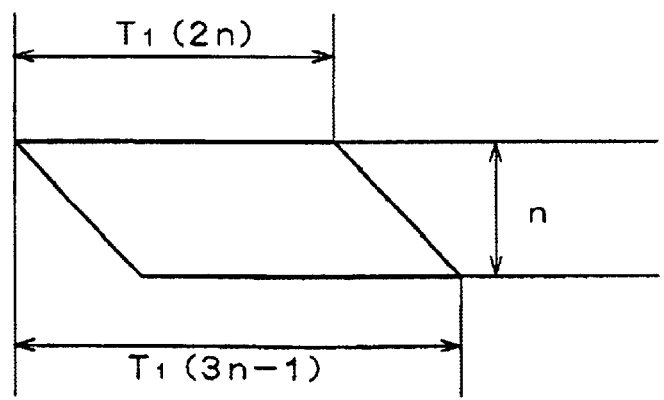
FIG. 8 is a diagram showing a process for performing the first convolution operation.
Figure 9:
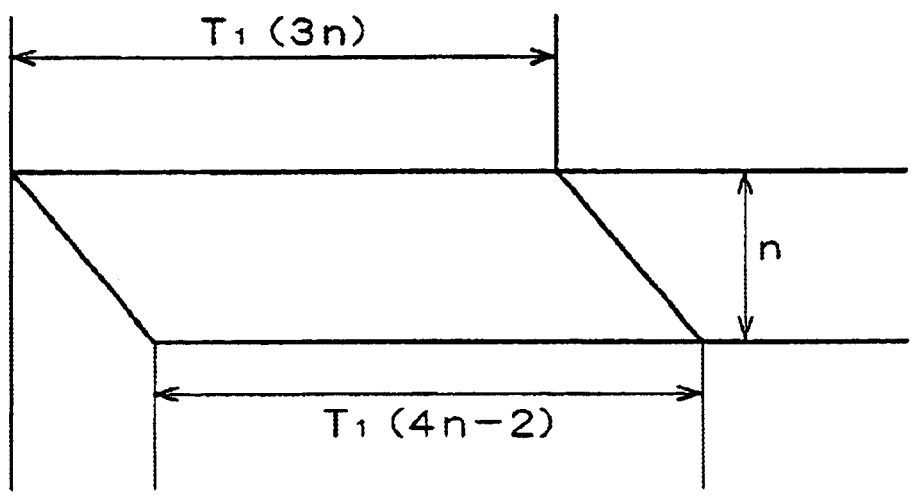
FIG. 9 is a diagram showing a process for performing the second convolution operation.
Figure 10:
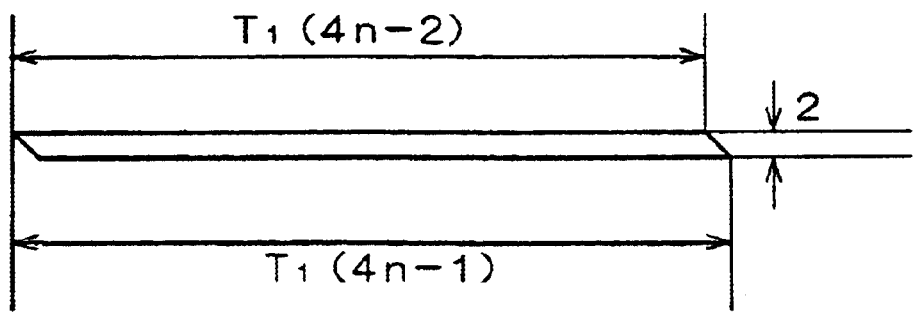
FIG. 10 is a diagram showing a process for performing the third convolution operation.

FIG. 7 is a diagram showing a waveform corresponding to the data of (1) in FIG. 4. This waveform corresponds to a zero-order hold unit pulse with an amplitude of 1 and a width of $2n \cdot T_1$. FIG. 8 is a diagram showing a process for performing the first convolution operation, and schematically showing how the amplitude and the width change. Also, FIG. 9 is a diagram showing a process for performing the second convolution operation, and schematically showing how the amplitude and the width change. FIG. 10 is a diagram showing a process for performing the third convolution operation, and schematically showing how the amplitude and the width change. As shown in FIG. 10, the third convolution operation results in the total width (data length) of plural data after interpolation being $(4n-1) \cdot T_1$.

Then, a continuity test for the waveform obtained by the second convolution operation is made. In FIG. 5, with the position in the transversal direction corresponding to x, the value y of each item of data at (A3) is obtained in the following way.

For $0 \leq x \leq n$, (y in this interval is denoted as $y_1$)

$$y_1 = (1 + 2 + \ldots + x) + (1 + 2 + \ldots + (x-1)) \quad (1)$$
$$= x(x+1)/2 + (x-1)x/2$$
$$= x^2$$

For $n \leq x \leq 3n$, (y in this interval is denoted as $y_2$)

$$y_2 = 2(1 + 2 + \ldots + n) - (1 + 2 + \ldots + (x-n)) + \quad (2)$$
$$n(2x - 2n - 1)$$
$$= n(n+1)(x-n)^2 + n(2x - 2n - 1)$$
$$= -x^2 + 4nx - 2n^2$$

For $3n \leq x \leq 4n$, (y in this interval is denoted as $y_3$)

$$y_3 = (-x + 4n)^2 \quad (3)$$
$$= x^2 - 8nx + 16n$$

In this way, it will be found that y is in a quadratic expression of x.

The inclination at x=n is obtained as follows.

$dy_1/dx = 2x = 2n$ $dy_2/dx = -2x + 4n = 2n$

Since both values are equal to 2n, indicating the inclinations at x=n are the same, it will be found that the data is smoothly connected.

Also, the inclination at x=3n is obtained as follows.

$dy_2/dx = -2x + 4n = -2n$ $dy_3/dx = 2x - 8n = -2n$

Since both values are equal to −2n, indicating that the inclinations at x=3n are the same, it will be found that the data is smoothly connected.

Figure 11:
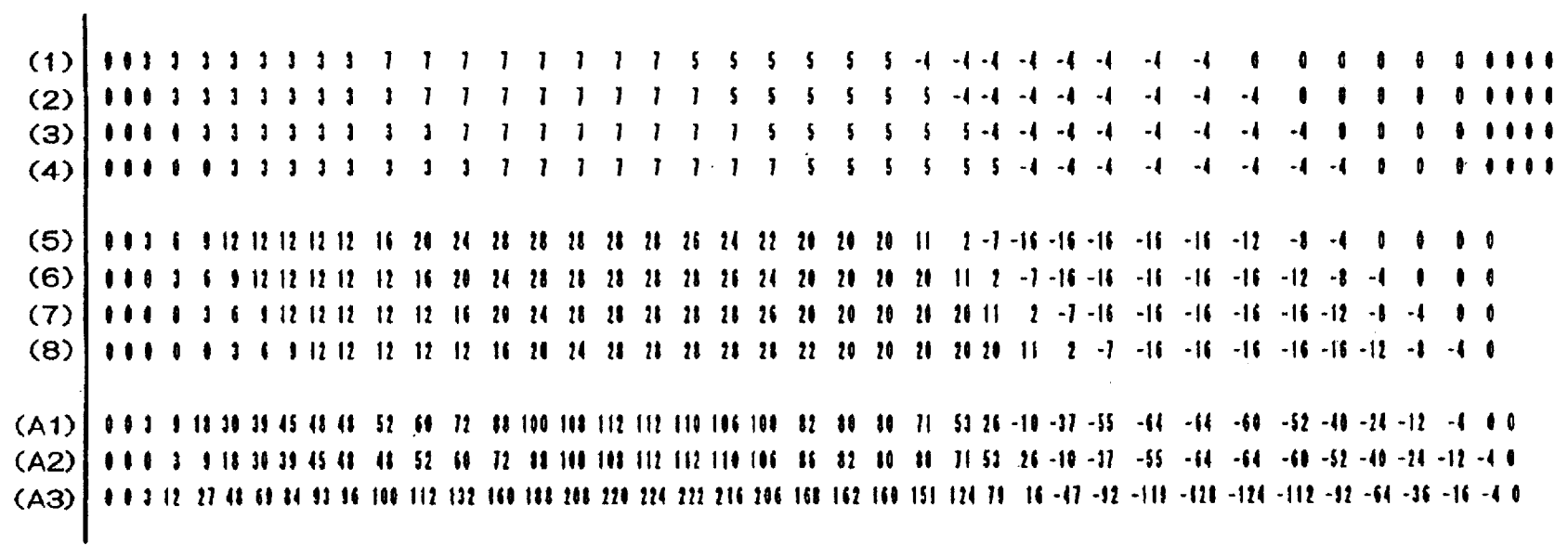

FIG. 11 is a diagram showing a specific example of the interpolation operation when 0, 3, 7, 5, −4, and 0 are input as the discrete data. For example, the specific example is shown in a case of n=4.

As listed at (1) in FIG. 11, first of all, eight zero-order hold oversampled data are generated from the input data. A four-phase convolution operation is performed, comprising generating four sets of data by shifting the eight pieces of input data by time $T_1$, as listed at (1) through (4) in FIG. 11, and then adding them, whereby a result of calculation can be obtained as listed at (5) in FIG. 11.

Similarly, a four-phase convolution operation is performed, comprising generating four sets of data by shifting the first convolution operation result as obtained in this way by time $T_1$, as listed at (5) through (8) in FIG. 11, and then adding them, whereby a result of calculation can be obtained as listed at (A1) in FIG. 11. Then a two-phase convolution operation (addition of (A1) data and (A2) data) is performed, comprising further shifting the data listed at (A1) by $T_1$ ((A2) in FIG. 11). Consequently, a calculation result is obtained as listed at (A3) in FIG. 11.

Figure 12:
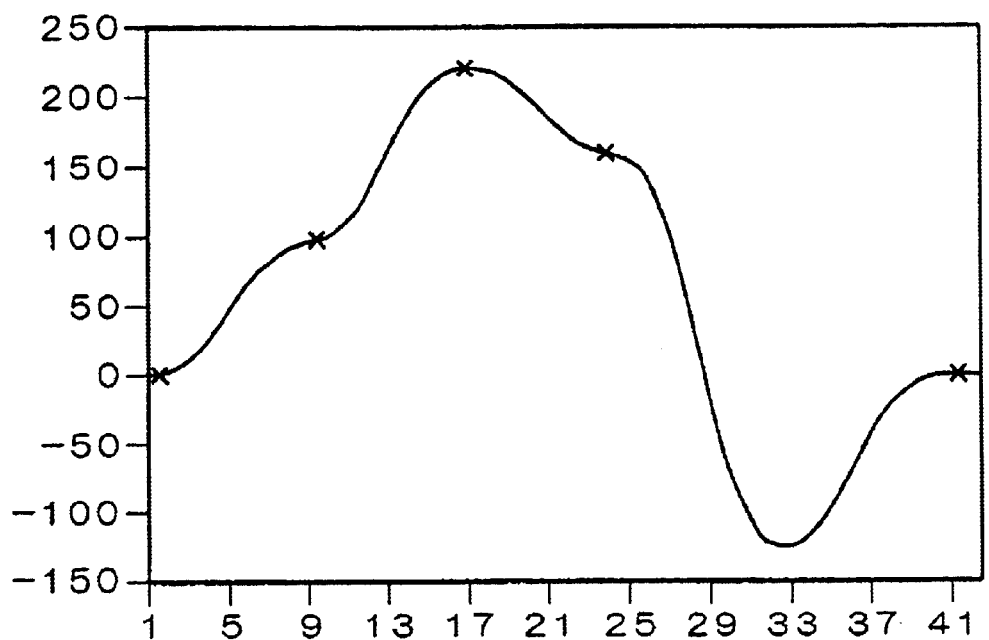
FIG. 12 is a graph showing a waveform that is obtained by arithmetic operation as shown in FIG. 11.

FIG. 12 is a graph showing a waveform that is obtained by arithmetic operation as shown in FIG. 11. The longitudinal axis indicates the amplitude, and the transversal axis indicates the time. As shown in FIG. 12, it can be found that the discrete input data is interpolated by the data connect with these data by quadratic function curve. The amplitude of output value corresponding to each input data is 32 times (=$2n^2$) the value of input data.

Figure 13:
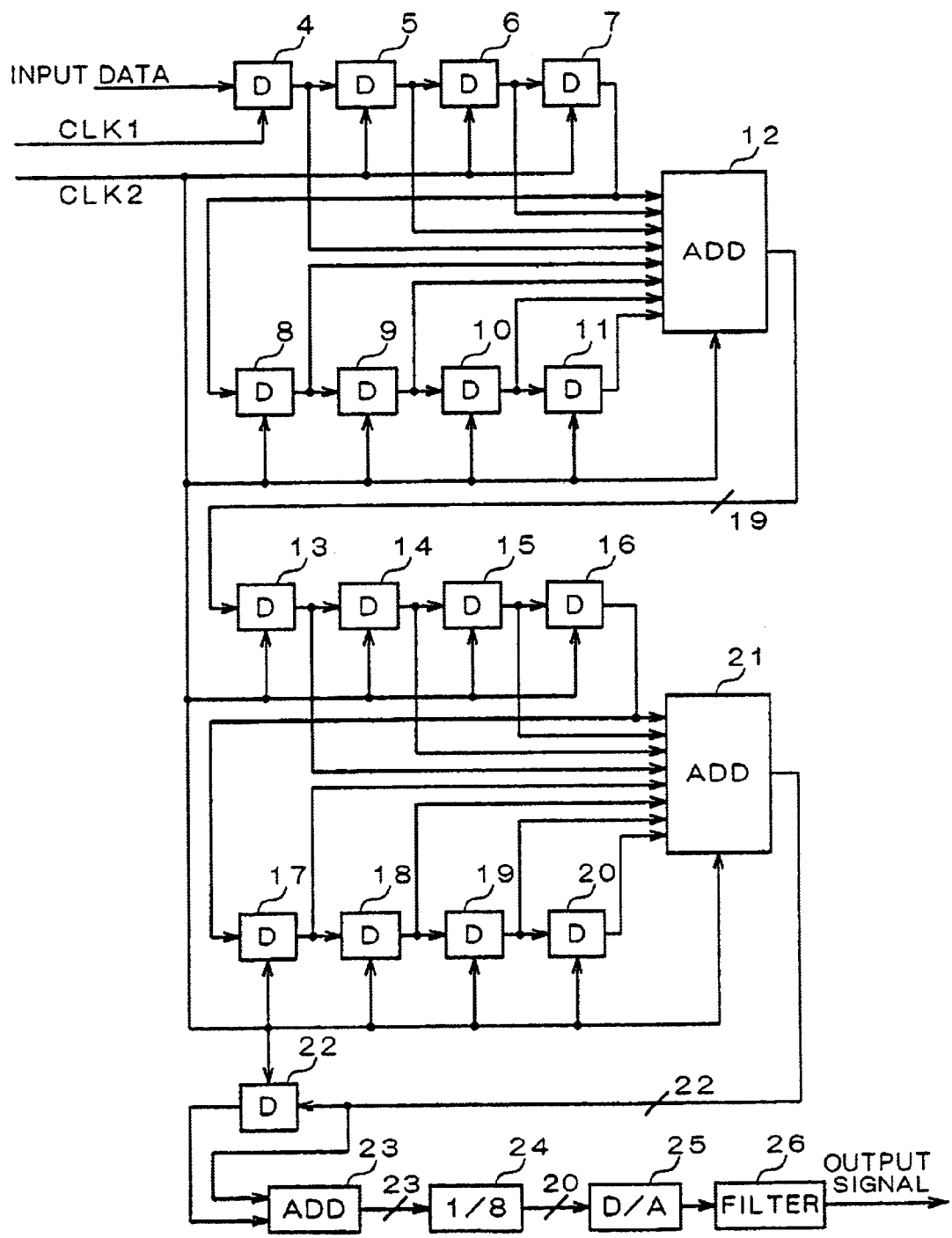
FIG. 13 is a diagram showing the configuration of a digital-analog converter of the first embodiment.

FIG. 13 is a diagram showing the configuration of a digital-analog converter in this embodiment of the invention. For example, a specific configuration is shown in a case of n=8.

As shown in FIG. 13, the digital-analog converter of this embodiment comprises eight D flip-flops 4 through 11 and an adder (ADD) 12 making up a first convolution operation circuit, eight D flip-flops 13 through 20 and an adder (ADD) 21 making up a second convolution operation circuit, a D flip-flop 22 and an adder (ADD) 23 making up a third convolution operation circuit, a divider 24, a digital-analog converter (D/A) 25, and a filter 26.

A basic clock signal CLK1 has the same frequency as the sampling frequency of the discrete input data, and is input into an initial stage D flip-flop 4. The discrete input data is fetched into the D flip-flop 4 in synchronism with this basic clock signal CLK1, and held. Also, a clock signal CLK2 has a frequency of 16 times the basic clock signal CLK1. All the D flip-flops at the second stage and beyond perform the operation of sampling the data in synchronism with the clock signal CLK2. The oversampling operation unit is constituted by two D flip-flops 4, 5 into which the clock signals CLK1, CLK2 having different frequencies are input.

If 16-bit data is input into the initial stage D flip-flop 4 in the first convolution operation circuit, seven D flip-flops 5 through 11 at the second stage and beyond accept the data held in this initial stage D flip-flop 4 in synchronism with the clock signal CLK2 in order and successively and shift the data. The adder 12 adds the data held in the eight D flip-flops 4 through 11. In this way, a result of arithmetic operation as listed at ($T_1$) in FIG. 4 can be obtained in the adder 12 within the first convolution operation circuit.

Also, eight D flip-flops 13 through 20 included in the second convolution operation circuit accept the 19-bit data output from the adder 12 within the first convolution operation circuit in synchronism with the clock signal CLK2 in order and successively and shift the data. The adder 21 adds the data held in the eight D flip-flops 13 through 20. In this way, a result of arithmetic operation as listed at (T2) in FIG. 5 can be obtained in the adder 21 within the second convolution operation circuit.

Further, the D flip-flop 22 included in the third convolution operation circuit accepts the 22-bit data output from the adder 21 within the second convolution operation circuit in synchronism with the clock signal CLK2. The adder 23 adds the data output from the adder 21 and the data held in the D flip-flop 22. In this way, a result of arithmetic operation as listed at (A3) in FIG. 5 can be obtained in the adder 23 within the third convolution operation circuit.

The 23-bit data output from the adder 23 is divided by 8 in the divider 24, and converted into the 20-bit data. This 20-bit data is converted into a stepwise analog signal by the digital-analog converter 25, which is then passed through the filter 2.6 for suppressing unnecessary radiation by removing a frequency component of 16 times the basic clock signal CLK1, and output.

[Second Embodiment]

By the way, in the first embodiment as described above, 2n pieces of zero-order hold data are produced by the oversampling operation on the basis of the input data and shifted by the data interval of $T_1$, and n sets of shifted data are added. However, the circuit can be simplified by modifying the addition order.

Figure 14:
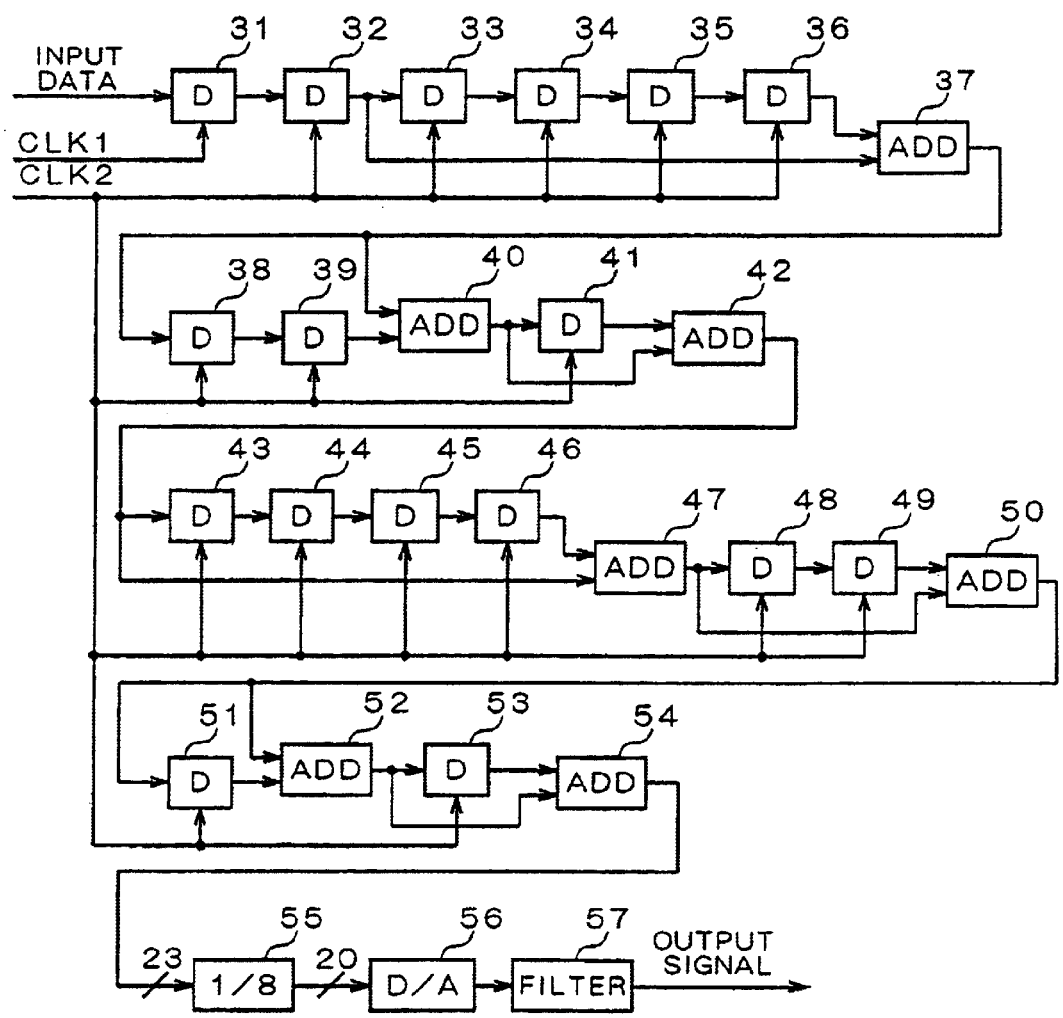
FIG. 14 is a diagram showing the configuration of a digital-analog converter of the second embodiment.

FIG. 14 is a diagram showing the configuration of a digital-analog converter according to a second embodiment of the invention. For example, a specific configuration is shown in a case of n=8.

As shown in FIG. 14, the digital-analog converter of this embodiment comprises nine D flip-flops 31 through 36, 38, 39, and 41 and three adders (ADD) 37, 40, 42 making up a first convolution operation circuit, seven D flip-flops 43 through 46, 48, 49 and 51 and three adders (ADD) 47, 50, 52 making up a second convolution operation circuit, a D flip-flop 53 and an adder (ADD) 54 making up a third convolution operation circuit, a divider 55, a digital-analog converter (D/A) 56, and a filter 57.

Instead of adding eight sets of data that are obtained by shifting eight pieces of zero-order hold data by the data interval $T_1$, the first convolution operation circuit involves a first addition operation of adding two sets of data shifted by the interval $4T_1$ at a time, a second addition operation of adding two sets of data shifted by the interval $2T_1$ at a time, and a third addition operation of adding two sets of data shifted by the interval $T_1$.

More specifically, employing four D flip-flops 33 through 36 included in the first convolution operation circuit, the data shifted by $4T_1$ (i.e., four periods of the clock signal CLK2) are generated from eight pieces of zero-order hold data successively input, and the first addition operation of adding the data output from the D flip-flop 32 and the data output from the D flip-flop 36 is performed by the adder 37. Also, employing two D flip-flops 38, 39, the data shifted by $2T_1$ are generated from the data output from the adder 37, and the second addition operation of adding the data output from the adder 37 and the data output from the D flip-flop 39 is performed by the adder 40. Further, employing the D flip-flop 41, the data shifted by $T_1$ is generated from the data output from the adder 40, and the third addition operation of adding the data output from the adder 40 and the data output from the D flip-flop 41 is performed by the adder 42. In this way, the same convolution operation is performed in the same manner as the first convolution operation circuit constituted by the eight D flip-flops 4 through 11 and the adder 12 as shown in FIG. 13.

Similarly, employing four D flip-flops 43 through 46 included in the second convolution operation circuit, the data shifted by $4T_1$ are generated from the data output from the adder 42 within the first convolution operation circuit, and the first addition operation of adding the data output from the adder 42 and the data output from the D flip-flop 46 is performed by the adder 47. Also, employing two D flip-flops 48, 49, the data shifted by $2T_1$ is generated from the data output from the adder 47, and the second addition operation of adding the data output from the adder 47 and the data output from the D flip-flop 49 is performed by the adder 50. Further, employing the D flip-flop 51, the data shifted by $T_1$ is generated from the; data output from the adder 50, and the third addition operation of adding the data output from the adder 50 and the data output from the D flip-flop 51 is performed by the adder 52. In this way, the same convolution operation is performed in the same manner as the second convolution operation circuit constituted by the eight D flip-flops 13 through 20 and the adder 21 as shown in FIG. 13.

Further, the D flip-flop 53 included in the third convolution operation circuit accepts the data output from the adder 52 within the second convolution operation circuit in synchronism with the clock signal CLK2. The adder 54 adds the data output from the adder 52 and the data output from the D flip-flop 53. In this way, the convolution operation is performed by the third convolution operation circuit.

The 23-bit data output from the adder 54 is divided by 8 in the divider 55, and converted into the 20-bit data. This 20-bit data is then converted into a stepwise analog signal by the digital-analog converter 56, which is then passed through a filter 57 for suppressing unnecessary radiation by removing a frequency component of 16 times the basic clock signal CLK1, and output.

FIG. 15 is a diagram showing a specific example of arithmetic operation in the first, second and third convolution operation circuits included in the digital-analog converter as shown in FIG. 14.

In FIG. 15, each item of data as listed at (1) shows the input data from the D flip-flop 32 into the adder 37, and each item of data as listed at (2) shows the data input from the D flip-flop 36 into the adder 37. Also, each item of data as listed at (T1) and (3) is the same, and is output from the adder 37. Each data as listed at (4) shows the data input from the D flip-flop 39 into the adder 40. Also, each item of data as listed at (T2) and (5) is the same, and is output from the adder 40. Each data as listed at (6) shows the data input from the D flip-flop 41 into the adder 42. Also, each item of data as listed at (T3) and (7) is the same, and is output from the adder 42. In this way, it will be found that the data ((T3) in FIG. 15) obtained by the first convolution operation circuit is exactly the same as the result of convolution operation as listed at (T1) in FIG. 4.

Similarly, in FIG. 15, each item of data as listed at (7) shows the data input from the adder 42 into the adder 47, and each item of data as listed at (8) shows the data input from the D flip-flop 46 into the adder 47. Also, each item of data as listed at (T4) and (9) is the same, and is output from the adder 47. Each data as listed at (10) shows the data input from the D flip-flop 49 into the adder 50. Also, each item of data as listed at (T5) and (11) is the same, and is output from the adder 50. Each data as listed at (12) shows the data input from the D flip-flop 51 into the adder 52. Also, each item of data as listed at (T6) and (A1) is the same, and is output from the adder 52. In this way, it will be found that the data ((T6) in FIG. 15) obtained by the second convolution operation circuit is exactly the same as the result of convolution operation as listed at (T2) in FIG. 5.

Figure 16:
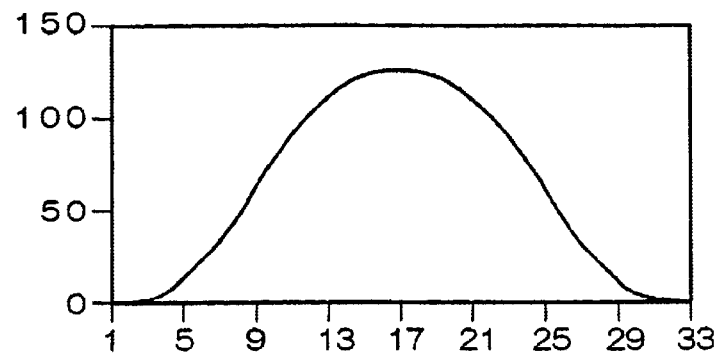
FIG. 16 is a graph showing a waveform that is finally obtained by arithmetic operation as shown in FIG. 15.

FIG. 16 is a graph showing a waveform that is finally obtained by arithmetic operation as shown in FIG. 15. The longitudinal axis indicates the amplitude, and the transversal axis indicates the time, respectively. As shown in FIG. 16, an original rectangular wave of zero-order hold data results in the oversampled data enveloped by a smooth quadratic function curve with a double width, the maximum amplitude being 128 times ($=2n^2$).

In this way, the configuration can be greatly simplified by changing the order of addition. For example, two adders 12, 21 having eight-input are employed in the configuration as shown in FIG. 13, but they can be implemented by seven two-input adders, or a total of 14 adders. On the other hand, six two-input adders 37, 40, 42, 47, 50 and 52 are employed, instead of two eight-input adders 12, 21 in the configuration as shown in FIG. 14, and two adders 12, 21 having eight-input a can be removed.

[Fourth Embodiment]

By the way, in the above embodiments, the discrete input data is considered to be a single pulse as shown in FIG. 1. However, a pulse with different amplitude and polarity may be symmetrically appended on both sides (fore and back sides) of this single pulse.

Figure 17:
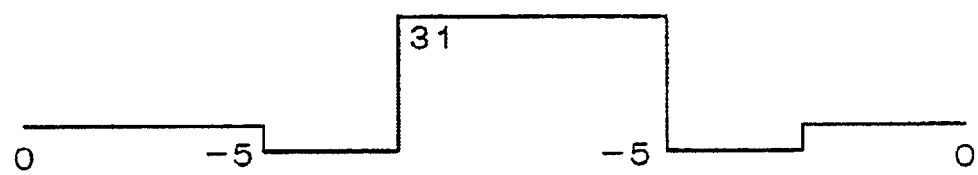
FIG. 17 is a diagram showing a waveform with another pulse symmetrically appended on both sides of the single input pulse.

FIG. 17 is a diagram showing a waveform with another pulse symmetrically appended on both sides of the single input pulse.

Figure 18:
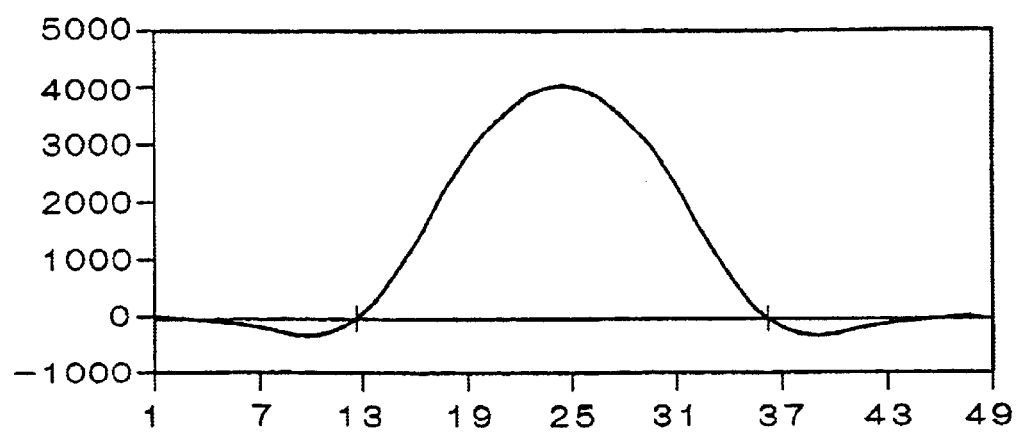
FIG. 18 is a graph showing a result of effecting plural convolution, after appending another pulse of FIG. 17 to the input data.

FIG. 18 is a graph showing a result of effecting plural convolution operations on the basis of the operational principle as shown in FIGS. 1 through 3, after appending another pulse of FIG. 17 to the input data. As shown in FIG. 18, a typical interpolation function having positive and negative values can be obtained by performing plural convolution operations after appending a pulse with different amplitude and polarity on both sides of the single pulse.

Figure 19:
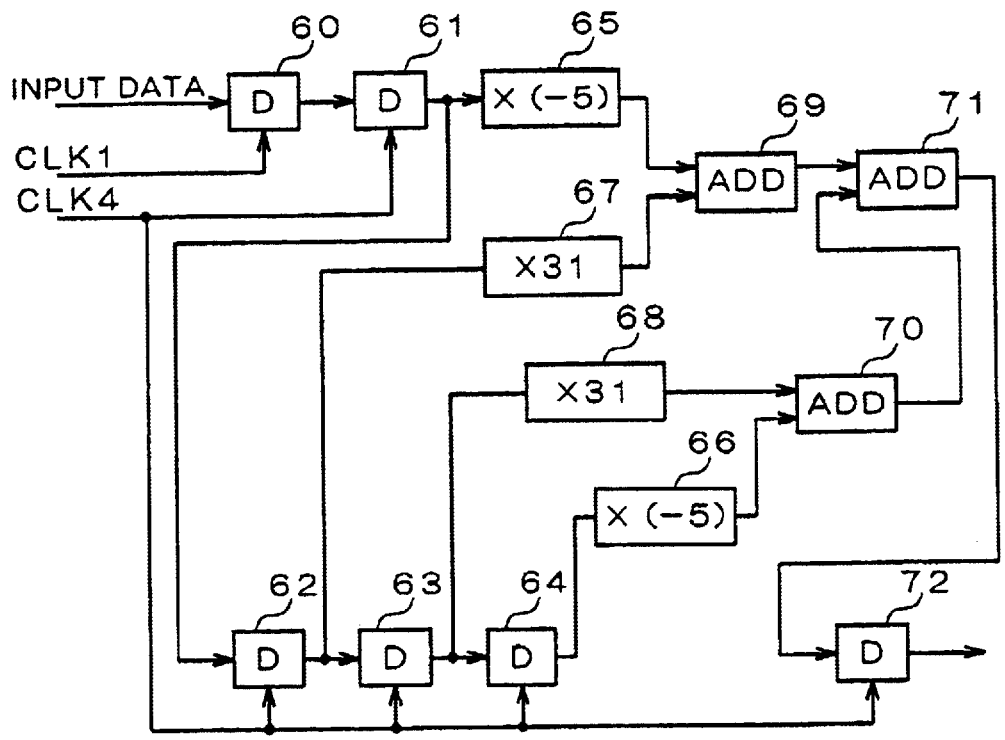
FIG. 19 is a circuit diagram showing the configuration of a circuit for appending another pulse on both sides of the zero-order hold, single pulse.

FIG. 19 is a diagram showing the configuration of a circuit for appending another pulse on both sides of the zero-order hold, single pulse. A pulse appending circuit (corresponding to data appending unit) as shown in FIG. 19 comprises six D flip-flops 60 through 64, 72, four multipliers 65 through 68, and three adders 69 through 71. An initial stage D flip-flop 60 fetches the data in synchronism with the basic clock signal CLK1 and holds it. Four D flip-flops 61 through 64 connected in tandem operate in synchronism with a clock signal CLK4 having a frequency of one-half the basic clock signal CLK1, to accept the data output from the initial stage D flip-flop 60 in order and successively and hold it. Each output data of the D flip-flop 61, 64 is input into the multiplier 65, 66 having a multiplying factor "−5", respectively. Each output data of the D flip-flop 62, 63 is input into the multiplier with a multiplying factor "31". And the results of multiplication from each of these four multipliers 65 through 68 are added by three adders 69 through 71. In this way, a pulse of FIG. 17 is output from a final stage adder 71. It should be noted that various interpolation functions can be produced by changing the number of stages for the D flip-flop and the multiplying factor or polarity of the multiplier.

[Fifth Embodiment]

In the first and second embodiments as previously described, the discrete input data is interpolated between the data by means of a quadratic function curve. However, the data may be interpolated using the straight line for various purposes.

Figure 20:
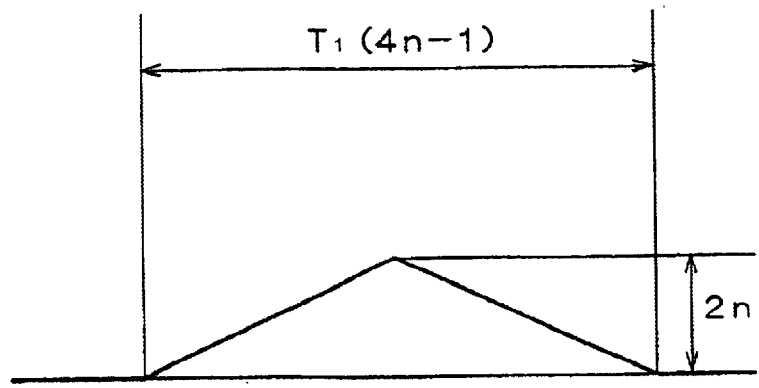
FIG. 20 is a graph for explaining the principle of linear interpolation.

FIG. 20 is a graph for explaining the principle of linear interpolation. A convolution operation of shifting the zero-order hold data with a length of $2n \cdot T_1$ and an amplitude of 1 as shown in FIG. 1 by $T_1$ and adding them 2n times, so that an equilateral triangular wave with a base of $(4n-1) \cdot T_1$ and an amplitude of 2n as shown in FIG. 20 can be obtained.

In this way, the output data enveloped by the equilateral triangular wave can be obtained by oversampling the zero-order hold input data 2n times and performing the 2n-phase convolution operation. Accordingly, considering the case of zero-order holding the discrete input data successively, the equilateral triangular wave corresponding to each input data is generated, shifted by $2n \cdot T_1$, and the output data is 2n pieces of data passing through 2n times the input data and connecting them along the equilateral triangular wave.

Figure 21:
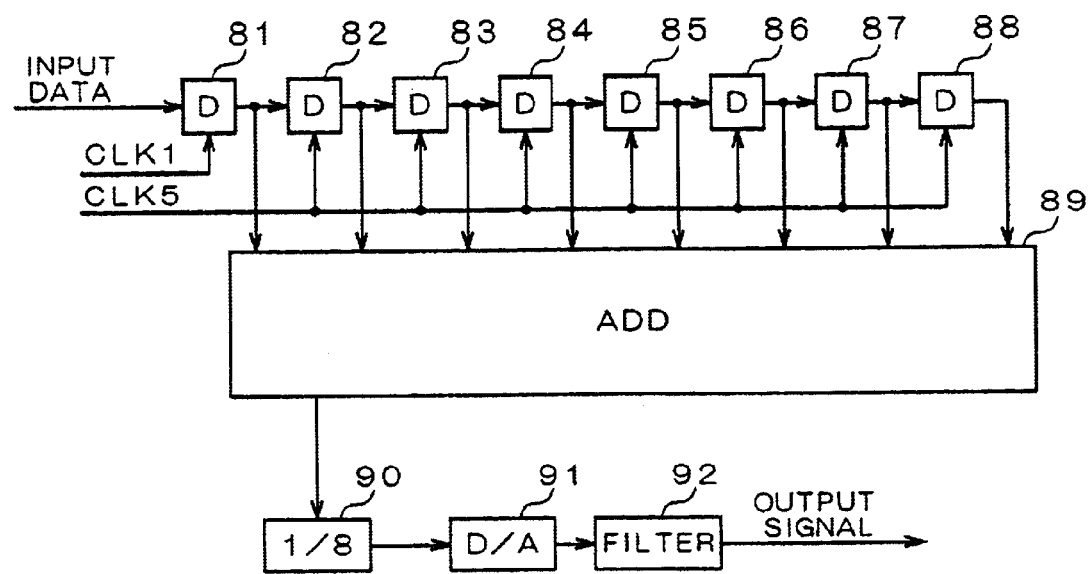
FIG. 21 is a circuit diagram showing the configuration of a digital-analog converter for linear interpolation of the fifth embodiment.

FIG. 21 is a diagram showing the configuration of a digital-analog converter for linear interpolation in this embodiment. For example, a specific configuration in a case of n=4 is shown.

As shown in FIG. 21, the digital-analog converter of this embodiment comprises eight D flip-flops 81 through 88 and an adder (ADD) 89 making up a convolution operation circuit, a divider 90, a digital-analog (D/A) converter 91, and a filter 92.

If the data is input into an initial stage D flip-flop 81 included in this convolution operation circuit, seven D flip-flops 82 through 88 at the second stage and beyond fetch the data held in this initial stage D flip-flop 81 in synchronism with a clock signal CLK5 (having a frequency of eight times the basic clock signal CLK1) in succession and shift them. The adder 88 adds the data held in eight D flip-flops 81 through 88, respectively. In this way, the convolution operation is performed.

The data output from the adder 88 is divided by 8 in the divider 89, and then converted into a stepwise analog signal by the digital-analog converter 91, which is then passed through a filter 92 for suppressing unnecessary radiation by removing a frequency component of eight times the basic clock signal CLK1, and output.

Figure 22:
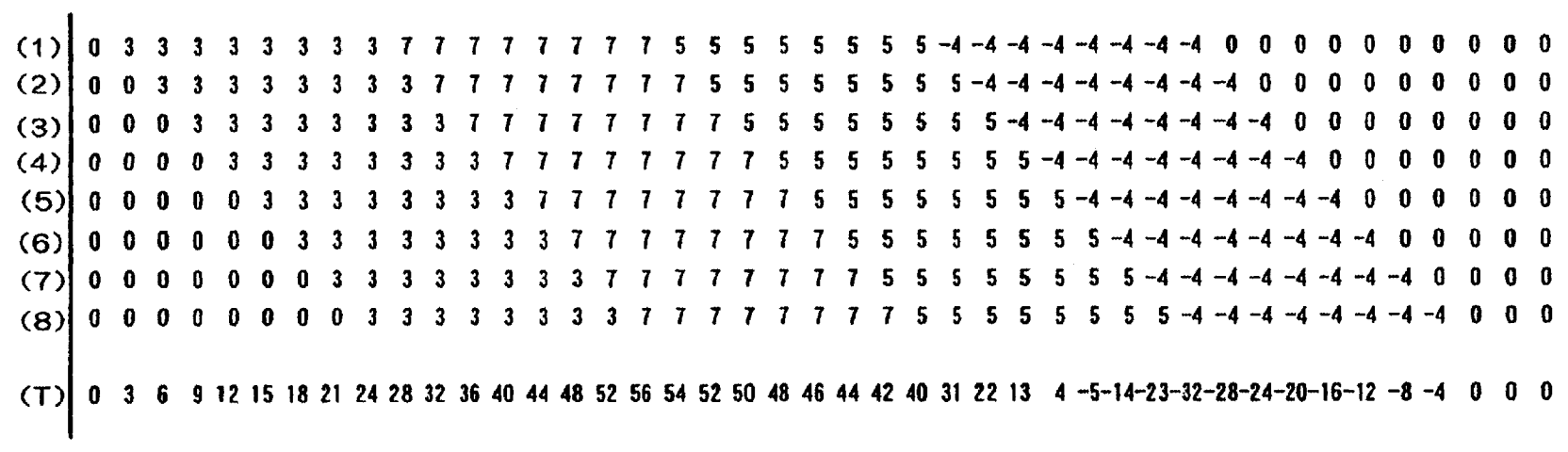

FIG. 22 is a diagram showing a specific example of interpolation operation in the case where the discrete input data are 0, 3, 7, 5, −4 and 0. For example, a specific example in a case of n=4 is shown.

As listed at (1) in FIG. 22, first of all, eight pieces of zero-order hold data is generated for the input data. An eight-phase convolution operation is performed, comprising generating eight sets of input data by shifting the eight pieces of input data by time $T_1$, as listed at (1) through (8) in FIG. 22, and then adding them in the adder 89, so that a result of calculation as listed at (T) in FIG. 22 can be obtained.

Figure 23:
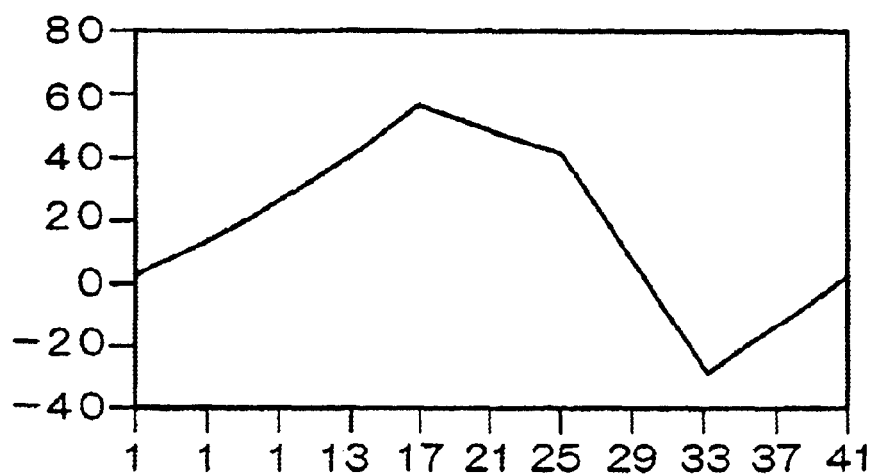
FIG. 23 is a graph showing a waveform that is obtained by arithmetic operation as shown in FIG. 22.

FIG. 23 is a graph showing a waveform that is obtained by arithmetic operation as shown in FIG. 22. The longitudinal axis indicates the amplitude, and the transversal axis indicates the time. As shown in FIG. 23, it can be found that the discrete input data is interpolated by data connecting with these data by a straight line. The amplitude of output value corresponding to each input data is eight times (=2n) the value of input data. The digital-analog converter as shown in FIG. 22 restores the amplitude to an original value, employing a divider 90.

In the above embodiments, this invention is applied to the digital-analog converter. However, an oversampling circuit may be configured in which an oversampling operation of 2n times the input data is performed by removing the divider, the digital-analog converter and the filter included in each digital-analog converter.

INDUSTRIAL APPLICABILITY

As described above, with this invention, the zero-order hold discrete data can be interpolated with a simple constitution to obtain a smooth waveform or a linearly interpolated waveform. For example, the digital-analog converter of this invention may be replaced with the conventional digital-analog converter used for the digital audio equipment by adding an oscillation circuit with PLL to improve the quality of sound.

Since the interpolated data can be easily generated without referring to the table in the image processing, an extremely wide application range can be considered.

What is claimed is:

1. An interpolation circuit comprising:
   oversampling operation unit for performing oversampling operation from zero-order hold input data; and
   convolution operation unit for performing convolution operation on plural data obtained by said oversampling operation unit twice or more repeatedly,
   characterized in that interpolated data is generated along a quadratic function curve passing through the integral multiples of the value of said input data.

2. An interpolation circuit, characterized by comprising:
   oversampling operation unit for performing oversampling operation from zero-order hold input data;
   first convolution operation unit for performing convolution operation on plural first data obtained by said oversampling operation unit to calculate plural second data enveloped by a symmetrical trapezoid of the shape having an upside of substantially 0.5 times a width of original input data and a base of substantially 1.5 times the width; and
   second convolution operation unit for performing convolution operation on said plural second data obtained by said first convolution operation unit to calculate plural third data enveloped by a smooth quadratic function curve having the width of a base being substantially twice the width of original input data.

3. An interpolation circuit, characterized by comprising:

oversampling operation unit for performing oversampling operation from zero-order hold input data; and convolution operation unit for performing convolution operation on plural data obtained by said oversampling operation unit to calculate plural data enveloped by an equilateral triangle having the width of a base being substantially twice the width of said input data.

4. An interpolation circuit, characterized by comprising:

oversampling operation unit for performing oversampling operation from zero-order hold input data with a sampling period of 2n·T1 at a time interval of T1;

first convolution operation unit for performing convolution operation of n phases by adding plural data obtained by said oversampling operation unit n times with the data shifted by the time interval of T1; and second convolution operation unit for performing convolution operation of n phases by adding plural data obtained by said first convolution operation unit n times with the data shifted by the time interval of T1.

5. The interpolation circuit according to claim 4, characterized in that at least one of said first and second convolution operation unit comprises data holding unit for holding n pieces of data output from said oversampling operation unit while shifting, and addition unit for adding n pieces of data held in said data holding unit.

6. The interpolation circuit according to claim 1, characterized by comprising data appending unit for appending data having the symmetrical values proportional to the input data before and after said input data in the former stage of said oversampling operation unit.

7. The interpolation circuit according to claim 2, characterized by comprising data appending unit for appending data having the symmetrical values proportional to the input data before and after said input data in the former stage of said oversampling operation unit.

8. The interpolation circuit according to claim 3, characterized by comprising data appending unit for appending data having the symmetrical values proportional to the input data before and after said input data in the former stage of said oversampling operation unit.

9. The interpolation circuit according to claim 4, characterized by comprising data appending unit for appending data having the symmetrical values proportional to the input data before and after said input data in the former stage of said oversampling operation unit.

10. The interpolation circuit according to claim 5, characterized by comprising data appending unit for appending data having the symmetrical values proportional to the input data before and after said input data in the former stage of said oversampling operation unit.

* * * * *